United States Patent [19]
Tümer

[11] Patent Number: 6,150,849
[45] Date of Patent: *Nov. 21, 2000

[54] READOUT CHIP FOR NUCLEAR APPLICATIONS

[76] Inventor: Tümay O. Tümer, 107 Sweetwood Ct., Riverside, Calif. 92507

[*] Notice: This patent is subject to a terminal disclaimer.

[21] Appl. No.: 08/866,117

[22] Filed: Jun. 27, 1997

Related U.S. Application Data

[63] Continuation-in-part of application No. 08/460,489, Jun. 2, 1995, Pat. No. 5,696,458.
[51] Int. Cl.$^7$ ........................................................ H03K 5/22
[52] U.S. Cl. ................................. 327/70; 327/51; 327/69; 327/63; 327/71; 327/77; 327/80; 327/94
[58] Field of Search ................................... 327/58, 69, 51, 327/70, 18, 80, 94, 50, 71, 77

[56] References Cited

U.S. PATENT DOCUMENTS

| | | | |
|---|---|---|---|
| 3,430,197 | 2/1969 | Brown | 327/69 |
| 3,863,056 | 1/1975 | Klein | 327/69 |
| 3,900,744 | 8/1975 | Lammers | 327/58 |
| 4,556,982 | 12/1985 | Dunn | 327/71 |

*Primary Examiner*—Dinh T. Le
*Attorney, Agent, or Firm*—Snider & Associates; Ronald R. Snider

[57] ABSTRACT

A multi-channel readout chip is provided in which each channel has an analog section and a digital section. Each channel of the readout chip employs low noise charge sensitive amplifier inputs with self triggering output. The trigger threshold can be adjusted to provide energy discrimination. The chip has different, externally selectable, operational modes including a sparse readout mode in which only the channels which have received signals greater than a preselected threshold value are readout. The sparse readout mode results in increased data throughput, thus providing fast data acquisition capabilities.

48 Claims, 2 Drawing Sheets

READOUT CHIP FOR NUCLEAR APPLICATIONS

This invention is a continuation-in-part of U.S. application Ser. No. 08/460,489, filed Jun. 2, 1995, Pat. No. 5,696,458. The entire disclosure of that related application is incorporated herein by reference for all purposes.

GOVERNMENT RIGHTS NOTICE

This invention was made with U.S. Government support under Contract Numbers R43MH49923, DASGG60-92-V-0200, and DAMD17-96-1-6256. The first contract was awarded by the Department of Health and Human Services. The second and third contracts were awarded by the Department of Defense. The U.S. Government has certain rights in the invention.

The present invention relates generally to data acquisition systems, and more particularly to a front end electronics readout chip.

BACKGROUND OF THE INVENTION

The successful application of solid state detectors such as silicon strip detectors for high energy physics experiments was largely due to the development of is multi-channel front-end readout electronics mixed signal Application Specific Integrated Circuits (ASIC) chips, such as the SVX and Amplex chips. Without these monolithic CMOS chips high resolution particle detectors would not be practical. These chips were read out in conjunction with an external trigger supplied by the particle accelerator supplying the particle beam to the experiment. The trigger notifies the control electronics when to read the ASIC chips.

Physics, medicine, materials science, non-destructive evaluation, manufacturing, and environmental science are in need of room temperature, high resolution, and/or position-sensitive radiation detectors. The present scintillator and CCD-based technologies either cannot produce high resolution imaging or do not have the sensitivity. Room temperature radiation detectors are the driving force behind the current effort to develop II–VI semiconductor materials. A room temperature, position-sensitive, high resolution technology such as silicon strip, silicon drift, or silicon pixel detectors coupled to dedicated readout electronics may fill many of the demands of the new detection applications and push radiation imaging to a new level of resolution and flexibility. Unfortunately, the ASIC chips developed for high energy physics experiments cannot be used for most commercial applications such as medical and industrial imaging where an external trigger signal is unavailable.

A front end electronics readout mixed signal ASIC chip normally has a large number of identical channels within a single monolithic chip. The channel number typically ranges from 4 to 256. Newer versions with more channels may be fabricated as narrower (i.e., less than 1 micrometer) processing capabilities become available. One of the principal benefits of these chips is the ability to handle the readout from detectors with extremely large numbers of channels. Because these chips can amplify minute amounts of charge produced by the detectors they are subject to noise problems. In order to reduce the noise, the chips are typically mounted very close to the detector element, strip, pad, or pixel. The detector elements, strips, pads, or pixels are then connected directly or indirectly with the shortest possible length to the input of the ASIC chip. The power supply rails have to be bypassed very close to the ASIC chip as well. The control and output signals are connected to control electronics which controls and interfaces the ASIC chip to the host computer.

Most conventional ASIC chips can only handle low capacitance inputs. They have fixed peaking times, no self trigger output, and either no sparse readout capability or only straight sparse readout capability.

From the foregoing, it is apparent that an ASIC chip which is suitable for use with position sensitive solid state detectors for nuclear instruments is desirable.

SUMMARY OF THE INVENTION

The present invention provides a front end multi-channel readout chip which can be used with a variety of different detectors. Each channel of the readout chip consists of an analog section which provides analog output signals on an A (i.e., analog) bus, and a digital section which provides fast trigger signals on a T (i.e., trigger) bus. Input from a detector goes directly into a low noise charge sensitive preamplifier 103. The output of the preamplifier goes into a polarity switching circuit and then an amplifier with gain. The next stage is a shaper amplifier with a variable peaking time followed by a peak hold (peak detect) circuit. The output of the peak hold circuit goes into two comparators. The first comparator is a low level discriminator and produces the trigger signal. The second comparator provides a higher level discriminator than the first. Therefore the second comparator can be used to reject events that produce a signal above a set pulse height. The signals from the first comparator from all the channels are sent to a separate OR circuit to produce the external trigger output. The trigger output signals the external readout interface that an event has occurred and provides an accurate timing of the event. There are several readout modes for the preferred embodiment of the chip, some of which are: (i) a sparse readout mode which allows the readout of only the input channels that have a signal; (ii) a nearest neighbor readout mode which allows the readout of the detector strips with a signal and the two nearest neighbors; (iii) an all channel readout mode which allows the readout of all the channels of the chip in sequence; (iv) a global trigger mode; (v) an external delay mode; and (vi) a force enable mode which continuously connects any selected channel to the analog output.

A further understanding of the nature and advantages of the present invention may be realized by reference to the remaining portions of the specification and the drawings.

BRIEF DESCRIPTION OF THE DRAWINGS

FIG. 1 may be one of 32 channels according to the invention;

DESCRIPTION OF SPECIFIC EMBODIMENTS

The readout chip of the present invention is designed as a mixed signal ASIC CMOS chip. Although the preferred embodiment of the chip has 32 detector channels, the same basic design can be used with either fewer or greater numbers of channels (i.e., 4, 8, 16, 32, 128, 256, etc.). Most of the solid state and/or semiconductor detectors such as silicon strip, silicon pixel, silicon drift, silicon PIN photodiodes, germanium, CdZnTe, CdTe, selenium, $PbI_2$, GaAs, AlGaAs, InGaAs, HgBrI, and $HgI_2$ strip, pad, or pixel position sensitive detectors can be used with the present invention. Both single detectors as well as arrays of individual detectors can be used with the readout chip of the present invention.

Figure 1:
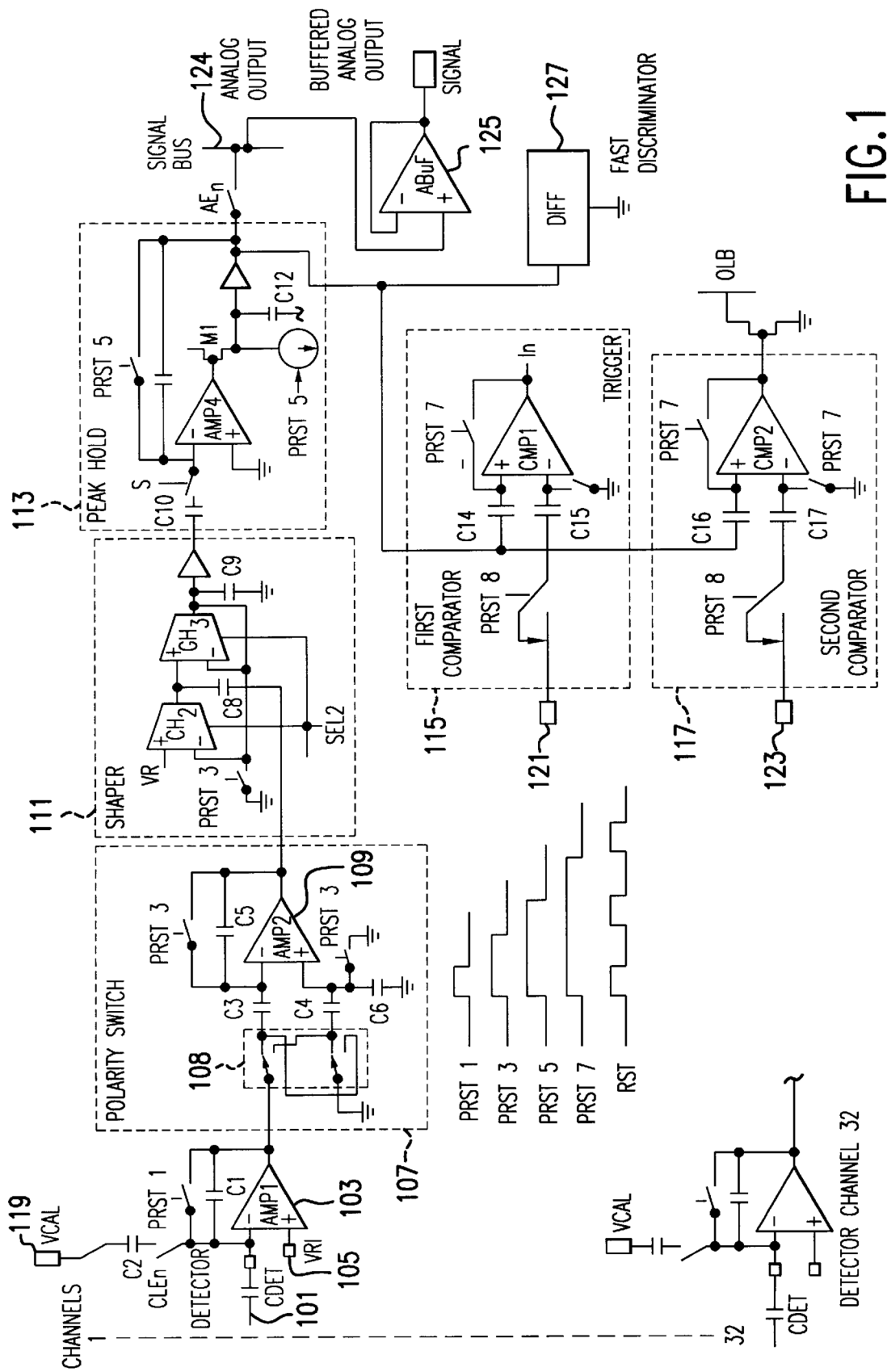
FIG. 1 is an illustration of a circuit diagram of one of a plurality of detector channels.

The preferred embodiment of a readout chip according to the present invention is a charge sensitive 32 channel mixed signal ASIC chip. This embodiment has a dynamic range of 125,000 electrons and a maximum output swing of 2 volts. Another embodiment of the chip has higher gain, lower noise, and a 50,000 electrons dynamic range. FIG. 1 is an illustration of a circuit diagram for the preferred embodiment of the invention in which only one channel is shown. An input 101 is single ended with an input amplifier 103 referenced to an external reference voltage source 105 that was measured to have an RMS noise level less than 1 microvolt a capacitor CDET connected to input 101 is the detector. Following input amplifier 103 is a polarity switching circuit 107, including another gain stage 109. The polarity switching circuit 107 allows the chip to accept either positive or negative charge pulses (either positive or negative input polarities can be selected by using the negative ("−") or positive ("+") inputs of the second stage amplifier 109, which is controlled by an externally supplied bit in the shift register.

The next stage in the analog-chain is a shaper 111 in which time constants from 0.4 to 6 microseconds can be selected via three shift register data bits (8 selections from 0.4 to 8 microseconds). A peak hold circuit 113 follows the shaper and is connected to two threshold comparators 115 and 117. First comparator 115 can be considered to be a lower level discriminator which only allows an output trigger if the peak hold output is larger than the first applied threshold voltage 121. Second comparator 117 issues a signal if the peak hold output is larger than the second applied threshold voltage 123 but does not effect the output trigger of the chip and can be thought of as an upper level threshold indicator. If interesting events are in a narrow energy band the two comparators can be set to enclose this band, therefore reducing noise and data throughput requirements. Each of the 32 channels' peak hold outputs are multiplexed to a single analog output buffer 125 on a bus 124. A differentiator circuit may be placed in front of one or more comparators to produce one or more fast trigger outputs with low jitter for timing purposes for use in the external circuit. One or more special purpose channels may be placed into the chip to measure the pedestal and noise levels. These channels may be read out separately or at the same time with the normal channels to record the pedestal or background levels at that time within or outside the chip. These channels may also be used for differential signal inputs from one or more detectors. A test/calibration input 119 is coupled to the input of all of the channels. Input 119 is used to test and calibrate the readout chip.

The readout chip of the present invention has several different readout modes. In the SPARSE mode only channels that are enabled and triggered are read out. In the GLOBAL TRIGGER mode all channels that are enabled are read out after any channel gets triggered. The SELECT ALL mode allows an external trigger to initiate readout of all enabled channels at any time. Nominally once a channel is triggered the rest of the channels get disabled within 2 to 50 nanoseconds. In the EXTERNAL DELAY mode the time after the initial trigger in which the other channels are disabled is controlled by an external input signal. In NEAR NEIGHBOR mode the nearest (adjacent) neighbors will also be read out together with the channel which produced the trigger. For diagnostic purposes there is a FORCE ENABLE mode that continuously connects a selectable single channel to the analog output. Up to sixteen readout chips according to the present invention may be daisy chained together.

Figure 2:
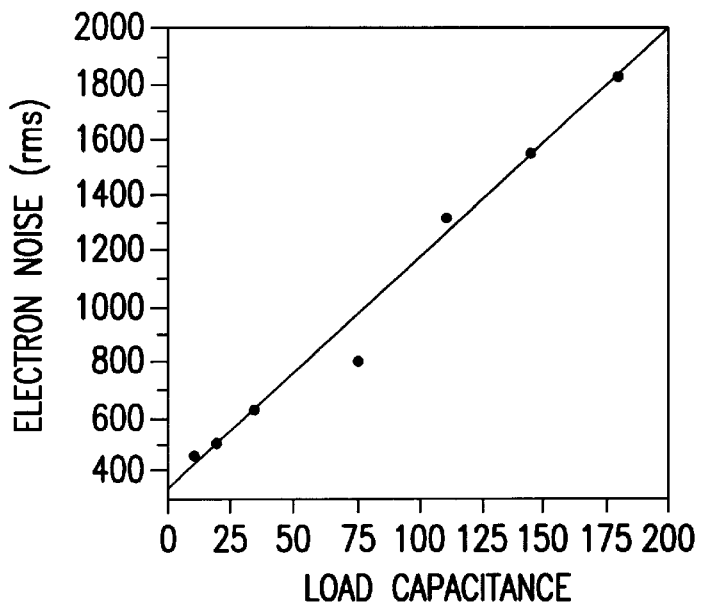
FIG. 2 graphically illustrates the measured RMS electron noise versus the input capacitance of a chip fabricated according to the invention.

FIG. 2 is a graph of the output noise in electrons RMS versus input capacitance for a chip according to the present invention. This test was done using the calibration pulse input feature and connecting different capacitance values on the input. The slope of the line yields a figure of 8.3 electrons per picofarad and intercepts the y-axis for zero capacitance at 340 electrons RMS. The large offset of 340 electrons RMS may be due to the fact that the capacitors were coupled to the chip through 1 centimeter of trace on a ceramic carrier and about 3 centimeters on a printed circuit board made of FR4.

Figure 3:
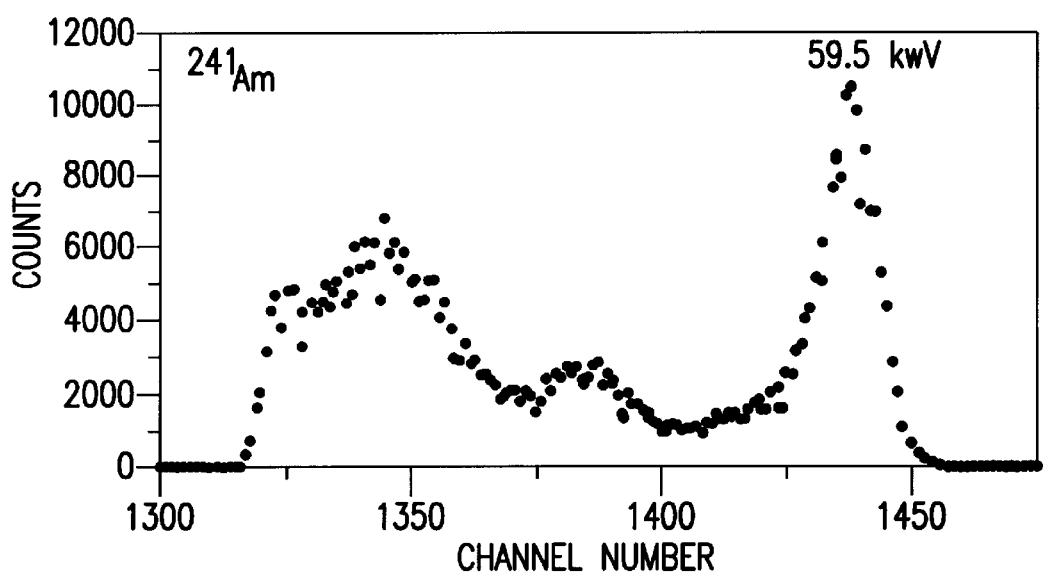
FIG. 3 is a preliminary $^{241}$Am x-ray spectrum from a CdZnTe detector.

FIG. 3 is a 241AM x-ray spectrum for a 3×3×2 mm$^3$ CdZnTe detector used in conjunction with a readout chip according to the present invention. The 59.5 keV peak has a width of about 400 electrons RMS.

The specifications of the preferred embodiment of the readout chip are as follows:

| | |
|---|---|
| Process | 1.2 μm low noise CMOS process or other processes |
| Number of channels | 32 (readout chips may be daisy chained to form a large number of channels) |
| Chip size | About 0.5 cm$^2$ or larger |
| Bonding pitch | 200 μm |
| Integration time (Peaking time) | 8 selections from 400 ns to 6 μs (other ranges possible) |
| Data readout time (first channel) | Dependent upon integration time (≈5 μs for 400 ns integration) |
| Noise | Approx. 100 electrons RMS at 6 μs for 0 pf input capacitance or 550 electrons RMS at 6 μs for 40 pF input capacitance |
| Power consumption | Approximately 3 mW/channel |
| Linear dynamic range | Analog branch: noise level to 150 ke (other ranges possible) |
| Input polarity | Both positive and negative input polarity can be selected |
| Low level trigger output | Range ≦220 keV. Walk ≈ 20 ns at 400 ns integration time (other ranges possible) |
| High level trigger output | Range ≦600 keV (other ranges possible) |
| Trigger output implementation | OR of the output of 32 comparators |
| Comparator level adjust | Both comparator levels are externally adjustable. Range of adjustment: noise level to range given above. |
| Trigger level drift | Stable to about 1% of trigger range |
| Cross talk | ≦1% |
| Dark current drift | Provision is built into the chip to eliminate premature channel firing due to an increase in noise on any channel. Accomplished by sending a command to turn off the offending channels. |
| Test/calibration input | Each channel connected to a test capacitor for testing and calibration of that channel through one test input |
| Test channels | Two extra channels are built into the chip to improve yield and for testing and debugging. Additional test channels can be included. Extra channels can be used to measure pedestal or common mode noise. Extra channels may also be used to measure differential signals from detectors. |
| Input capacitance | Optimized for input capacitance of 40 pF. It is expected to give much better noise performance for lower input capacitances and slightly worse |

-continued

| | |
|---|---|
| | noise for higher capacitances up to about 70 pF. Other embodiments of the readout chip can be optimized for lower or higher input capacitance. |
| Multi-hit capability | The events where more than one channel fires can be read out |
| Sparse data readout | In this mode the multi-hit events can be read out from the channels which contain data without reading channels which do not. |
| Nearest neighbor readout | In this mode all the channels are read out in sequence whether there is data or not |
| Delayed data readout | Provision is provided for data arriving at slightly different times |
| Delay between channels | There is about 250 ns delay between reading the channels which contain data, assuming fast readout capability from the external data acquisition system |
| Force enable mode | A selected channel continuously connected to the analog output |
| Data presentation | Internal chip logic asserts trigger output when low level comparator fires. It determines the address of the first channel with data, connects that channel to the output and waits for the handshake signal. When it receives the handshake signal it sends out the address of the second channel and connects that channel to the output. This proceeds until there are no more channels with data. When the last channel with data is reached a flag is raised to inform the external data acquisition system. The data acquisition system is required to send reset signals to clear the chip. The chip will not receive any new event during the readout cycle until fully reset. |
| Data acquisition scheme | The external data acquisition system waits for the trigger signal. When the signal comes it waits until the output is settled depending on the set integration time. It then reads out the address of the first channel and digitizes the analog signal. If the chip raises a flag to signal the end of the data, it goes into a stand-by mode. If no flag is raised, it reads out the second event. When the last channel is readout or the flag signal received indicating there are no more channels with valid data, then it sends reset signals to clear the chip so that a new event can be captured. |
| Dead time | Depends on the integration time (approximately 5 $\mu$s at 400 ns integration time for a single event). (If more than 1 channel has data, dead time only increases slightly). |

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

I claim:

1. A data readout integrated circuit comprising a plurality of readout channels coupled to a plurality of detectors through a plurality of detecting channels, respectively, for providing a plurality of readout signals at an output, each readout channel of said plurality of said readout channels comprising:

a means for receiving one detector signal;

a charge sensitive amplifier coupled to said receiving means for integrating said detector signal and outputting a voltage signal; and a polarity switching circuit coupled to said charge sensitive amplifier for generating a selecting signal by selectively allowing said voltage signal to have a positive polarity or a negative polarity; and a means for outputting one of said readout signals responsive to said selecting signal from said polarity switching circuit.

2. The data readout integrated circuit of claim 1, wherein said polarity switching circuit includes an amplifier.

3. The data readout integrated circuit of claim 1, wherein said polarity switching circuit is externally controlled.

4. The data readout integrated circuit of claim 1, further comprising a gain stage coupled to said polarity switching circuit.

5. The data readout integrated circuit of claim 1, further comprising a shaper amplifier for providing shaped, integrated detector signals responsive to said selected signal.

6. The data readout integrated circuit of claim 5, wherein said shaped, integrated detector signal is of an approximately inverted bell shaped form.

7. The data readout integrated circuit of claim 5, wherein said shaped, integrated detector signal is of an approximate uninverted bell shaped form.

8. The data readout integrated circuit of claim 5, further comprising a peak hold circuit coupled to output of shaper amplifier, wherein peak hold circuit have output which is coupled to a first plurality of comparators.

9. The data readout integrated circuit of claim 8, wherein a first comparator of said plurality of comparators is a low level discriminator, and wherein at least one of said first comparator allows an output trigger when a peak hold circuit output is larger than a first threshold voltage.

10. The data readout integrated circuit of claim 9, further comprising a second comparator of said plurality of comparators wherein said second comparator is an upper level discriminator, and wherein said second comparator only issues a signal when said peak hold circuit output is larger than a second threshold voltage.

11. The data readout integrated circuit of claim 10, wherein said first comparator and said second plurality of comparator enclose at least one predetermined energy band.

12. The data readout integrated circuit of claim 10, further comprising a differentiator circuit coupled to at least one of said first plurality of comparators, said differentiator circuit producing a fast trigger output with low jitter.

13. The data readout integrated circuit of claim 8, wherein an output of said peak hold circuit is multiplexed to said means for outputting.

14. The data readout integrated circuit of claim 10, wherein an output of at least one of said first comparator or said second plurality of comparator initiates a readout cycle of said data readout integrated circuit.

15. The data readout integrated circuit of claim 1, wherein said data outputting means outputs a readout signal for one channel of said plurality of integrated circuit channels containing a detected signal.

16. The data readout integrated circuit of claim 15, wherein said data outputting means only outputs said readout signal for said channel of said plurality of integrated circuit channels for which a trigger signal has been received.

17. The data readout integrated circuit of claim 15, wherein said data outputting means outputs said readout signal for said channel of said plurality of integrated circuit channels after said trigger signal has been received for any one of said plurality of integrated circuit channels.

18. The data readout integrated circuit of claim 17, wherein said trigger signal is an external trigger signal.

19. The data readout integrated circuit of claim 1, wherein said data outputting means output a readout signal for one triggered channel of said plurality of integrated circuit channels an disables all remaining channels of said plurality of integrated circuit channels, wherein a time delay between said readout signal and said disablement of said remaining channels is controlled by an externally supplied signal.

20. The data readout integrated circuit of claim 1, wherein said outputting means outputs a readout signal for one channel of said plurality of integrated circuit channels containing a detected signal and output the readout signal for each channel of said plurality of integrated circuit channels adjacent to said channel containing said detected signal.

21. The data readout integrated circuit of claim 1, wherein said means for outputting outputs a readout signal for one triggered channel of said plurality of integrated circuit channels containing a detected signal and disables all remaining channels of said plurality of integrated circuit channels.

22. The data readout integrated circuit of claim 1, wherein said plurality of said integrated circuit channels comprises at least one pedestal level measuring channel.

23. The data readout integrated circuit of claim 1, wherein said plurality of said integrated circuit channels comprises at least one differential signal processing channel.

24. The data readout integrated circuit of claim 5, further comprising a sample and hold circuits coupled to said shaper amplifier.

25. The data readout integrated circuit comprising a plurality of readout channels coupled to receive detected signals from detectors through a plurality of detector channels, respectively, each integrated circuit channel comprising:
   means for receiving one of said detected signals;
   a charge sensitive amplifier coupled to said receiving means for integrating said one of said detector signals and outputting a voltage signal;
   for outputting at least one of a plurality of analog signals associated with some of said plurality of integrated circuit channels and corresponding to said integrated detector signals;
   a switching circuit coupled to said charge sensitive amplifier for generating a selecting signal by selectively allowing said detected signal to have a positive polarity or negative polarity; and
   a means for outputting one of said readout signals responsive to said selecting signal from said switching circuit.

26. The data readout integrated circuit of claim 25, wherein said polarity switching circuit includes an amplifier.

27. The data readout integrated circuit of claim 25, wherein said polarity switching circuit is externally controlled.

28. The data readout integrated circuit of claim 25, further comprising a gain stage coupled to said polarity switching circuit.

29. A data readout integrated circuit comprising a plurality of readout channels respectively coupled to detectors through a plurality of detecting channels for providing readout signals at an output, each readout channel of said plurality of said readout channels comprising:
   a means for receiving one detector signal;
   a charge sensitive amplifier coupled to said receiving means for integrating said detector signal and outputting a voltage signal;
   a polarity switching circuit coupled to said charge sensitive amplifier for generating a selecting signal by selectively allowing said voltage signal to have a positive polarity or a negative polarity; and
   a shaper amplifier for providing shaped signal responsive to said switching signal; and
   a means for outputting one of said readout signals responsive to said shaped signal from said amplifier shaper.

30. The data readout integrated circuit of claim 29, wherein said shaped, integrated detector signal is of an approximately inverted bell shaped form.

31. The data readout integrated circuit of claim 29, wherein said shaped, integrated detector signal is of an approximately uninverted bell shaped form.

32. The data readout integrated circuit of claim 29, further comprising a peak hold circuit having input coupled to said shaper amplifier, wherein said peak hold circuit has outputs which is coupled to a comparator.

33. The data readout integrated circuit of claim 32, wherein said first comparator is low level discriminator, and wherein said first comparator only generates an output trigger when a peak hold circuit output is larger than a first threshold voltage.

34. The data readout integrated circuit of claim 33, further comprising a second comparator connected to the peak and hold output, wherein said second comparator is an upper level discriminator, and wherein at least one of said comparator only generates a signal when said peak hold circuit output is larger than a second threshold voltage.

35. The data readout integrated circuit of claim 34, wherein said first comparator and said second comparator encloses at least one preselected energy band.

36. The data readout integrated circuit of claim 34, further comprising a differentiator circuit coupled to said first comparator, said differentiator circuit producing fast output with low jitter.

37. The data readout integrated circuit of claim 32, wherein an output of said peak hold circuit is multiplexed to said means for outputting.

38. The data readout integrated circuit of claim 36, wherein an output of said first comparator or said second comparator initiates a readout cycle of said data readout integrated circuit.

39. The data readout integrated circuit of claim 29, wherein said data outputting means outputs a readout signal for a channel of said plurality of integrated circuit channels containing a detected signal.

40. The data readout integrated circuit of claim 39, wherein said data outputting means only outputs said readout signal for said one channel of said plurality of integrated circuit channels for which a trigger signal has been received.

41. The data readout integrated circuit of claim 39, wherein said data outputting means outputs said readout signal for said one channel of said plurality of integrated circuit channels after said trigger signal has been received.

42. The data readout integrated circuit of claim 41, wherein said trigger signal is an external trigger.

43. The data readout integrated circuit of claim 29, wherein said means for outputting outputs a readout signal from one channel containing a detected signal and disables all remaining channels of said plurality of integrated circuit channels, wherein a time delay between said readout signal and said disablement of said remaining channels is controlled by an externally supplied signal.

44. The data readout integrated circuit claim 29, wherein said outputting means outputs one readout signal for one channel of said plurality of integrated circuit channels containing a detected signal and outputs another readout signal for each channel of said plurality of integrated circuit channels adjacent to said channel containing said detected signal.

45. The data readout integrated circuit of claim 29, wherein said means for outputting outputs a readout signal for a triggered channel of said plurality of integrated circuit channels containing a detected signal and disables all remaining channels of said plurality of integrated circuit channels.

46. The data readout integrated circuit of claim 29, wherein said plurality of said integrated circuit channels comprise at least one pedestal level measuring channel.

47. The data readout integrated circuit of claim 29, wherein said plurality of said integrated circuit channels comprise at least one differential signal processing channel.

48. The data readout integrated circuit of claim 29, further comprising a sample and hold coupled to said shaper amplifier.

* * * * *